April 10, 1945.   A. VISCHER, JR   2,373,620
PRESSURE COOKER
Filed April 27, 1942   3 Sheets-Sheet 1
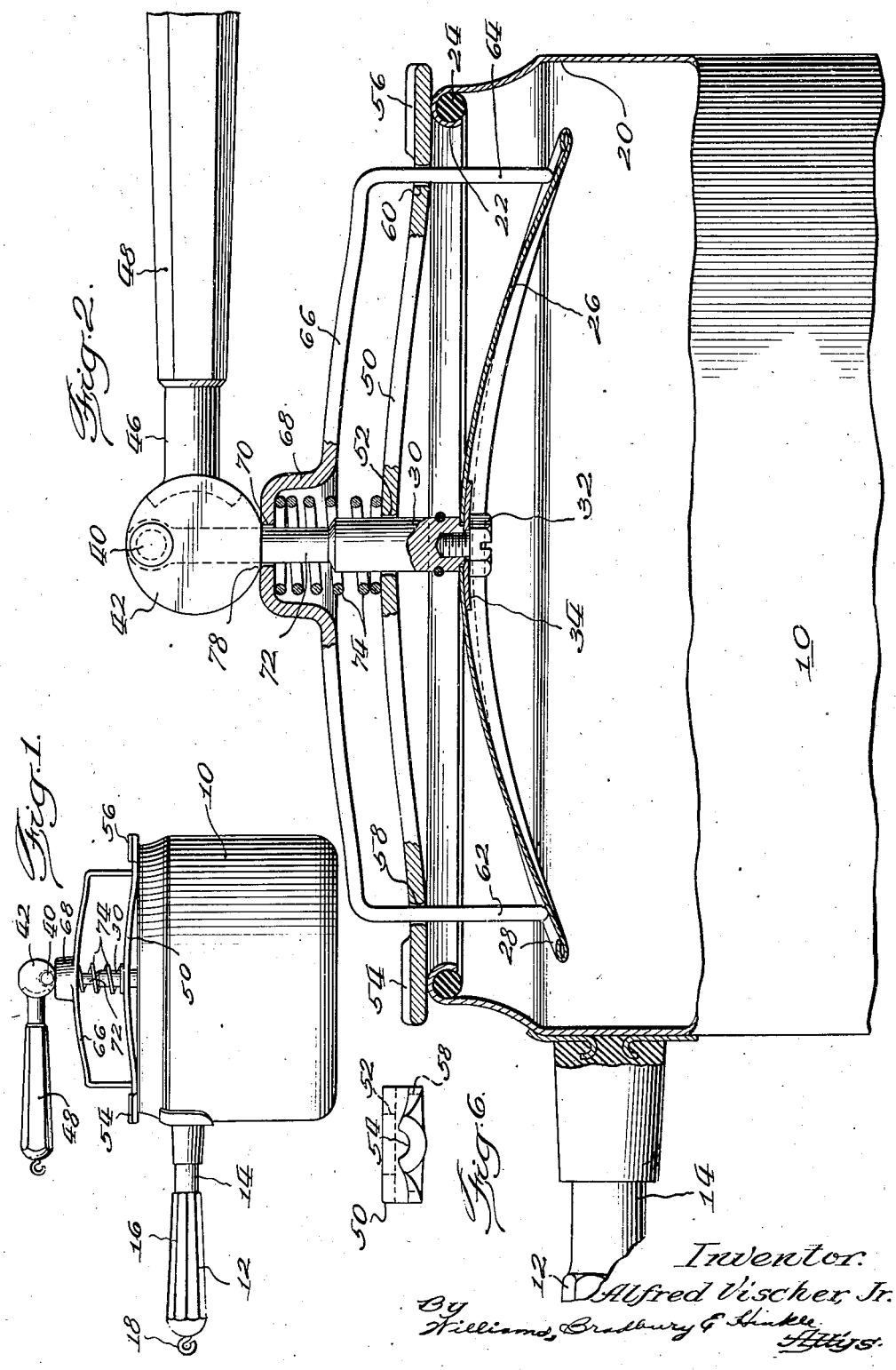
Inventor.
Alfred Vischer, Jr.
By Williams, Bradbury & Hinkle
Attys.

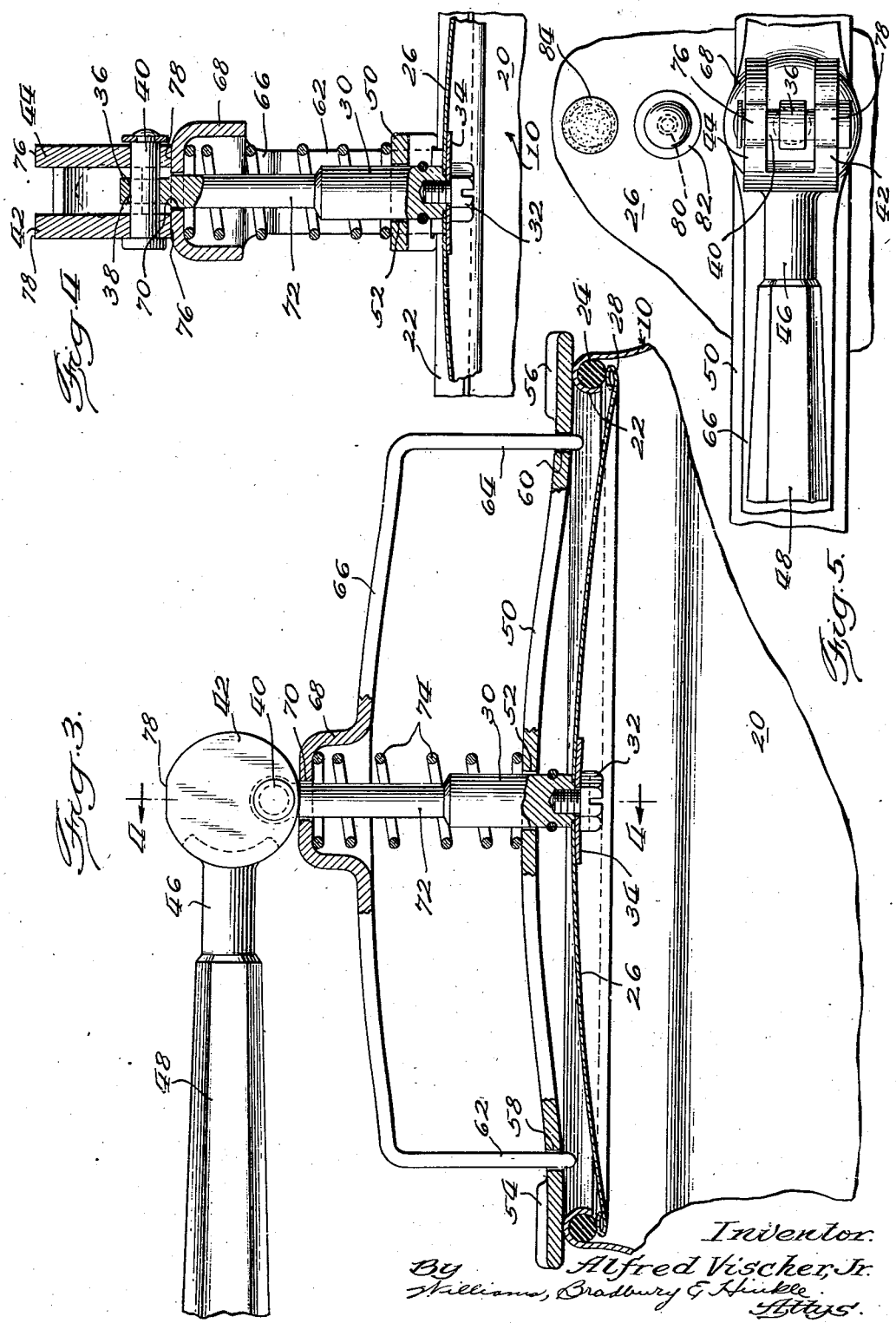

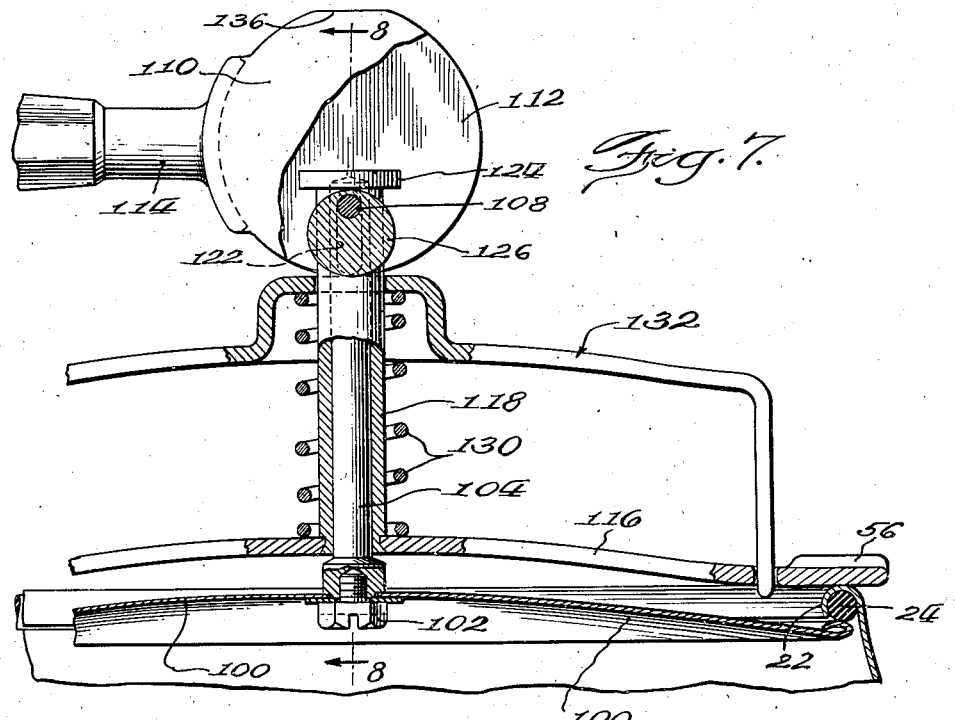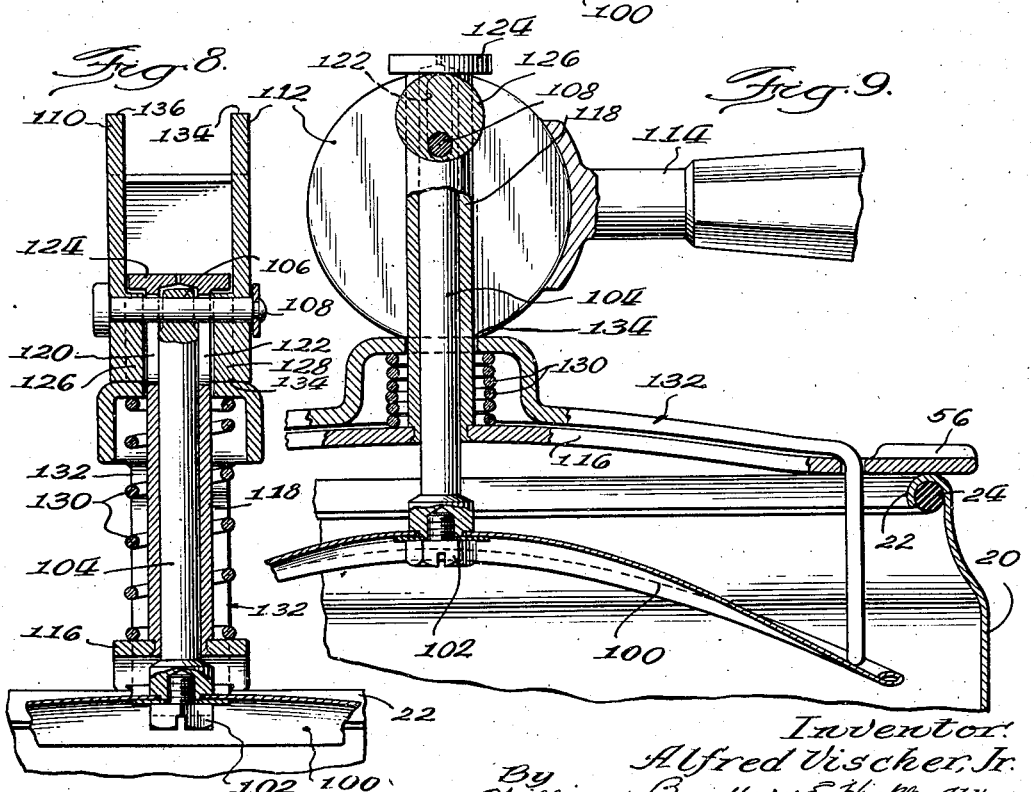

Patented Apr. 10, 1945

2,373,620

UNITED STATES PATENT OFFICE 2,373,620

PRESSURE COOKER

Alfred Vischer, Jr., Park Ridge, Ill., assignor to Vischer Products Company, Chicago, Ill., a corporation of Illinois Application April 27, 1942, Serial No. 440,578

10 Claims. (Cl. 220—25)

My invention relates to pressure cookers.

An object of my invention is to provide a new and improved pressure cooker which is inexpensive to manufacture and which may be made by conventional equipment.

Another object of my invention is to provide a pressure cooker which is of light weight and wherein the cover may be readily secured in place or removed after the cooking operation has been completed.

Another object of my invention is to provide a pressure cooker having a flexible cover which may be of conventional design.

Another object of my invention is to provide a pressure cooker having novel means for deforming the cover while the cover is being applied or removed.

Other objects and advantages will become apparent as the description proceeds.

In the drawings:

Fig. 1 is a side elevation of a pressure cooker embodying my invention;

Fig. 2 is an enlarged view showing parts in section and illustrating the condition of the cover while it is being applied or removed;

Fig. 3 is a partial section similar to Fig. 2 but showing the cover in sealing position;

Fig. 4 is a vertical section taken on the line 4—4 of Fig. 3;

Fig. 5 is a top view of the handle and adjacent part of the cover;

Fig. 6 is an end view of the cover yoke;

Fig. 7 is a sectional view of a modified form of my invention showing the cover and associated parts in applied position;

Fig. 8 is a vertical section taken on the line 8—8 of Fig. 7; and

Fig. 9 is a view similar to Fig. 7, but showing the cover and associated parts in the positions assumed while the cover is being applied or removed.

Referring to Figs. 1 to 6 inclusive of the drawings, it will be seen that I have illustrated therein a pressure cooker comprising a saucepan or similar container 10 having a handle 12, which may be of any suitable construction, but which preferably has a metal core 14 surrounded by a heat insulating sleeve 16 of wood or other suitable material. The handle 12 may be suspended from a hanger or other support.

In the particular embodiment illustrated in these figures of the drawings, I have illustrated the saucepan 10 as having a body 20 formed of sheet material which is turned back upon itself at 22 and forms an annular groove for a sealing ring 24, preferably made of a heat and grease resistant synthetic rubber substitute. The ring 24 and inturned portion 22 of the body 20 cooperate to form an inwardly directed flange surrounding a circular opening through which the cover is adapted to be inserted and removed.

The cover 26 is a circular disc of sheet steel or other flexible and preferably non-corrosive material. The outer edge of the cover is bent back upon itself as indicated at 28 to form a bead adapted to effect a fluid-tight seal with the sealing ring 24 when the cover is in assembled position on the saucepan 10.

A stem 30 is secured to the cover 26 by a screw 32, and a washer 34 is preferably interposed between the head of the screw 32 and the cover 26, although this washer may be omitted if desired. The upper end of the stem 30 may be flattened, as indicated at 36 in Fig. 4, and is provided with an opening 38 adapted to receive pivot pin 40, which is eccentrically mounted in discs 42 and 44 attached to handle 46. This handle may likewise be provided with an insulating sleeve 48 of wood or other suitable material.

A yoke 50 has a central opening 52 slidably receiving the enlarged lower end of the stem 30. The ends of the yoke 50 are adapted to overlie the inturned portions 22 of the saucepan and to rest thereon as the cover is being applied to the saucepan or being removed therefrom. As best shown in Fig. 6, these ends 54 and 56 are transversely curved where they rest on the inturned portion 22 of the saucepan.

The yoke 50 is also provided with openings 58 and 60 slidably receiving the downwardly extending ends 62 and 64, respectively, of a pressure bar 66. This pressure bar is provided with a central cup-shaped portion 68 having an opening 70 slidably receiving the intermediate portion 72 of the stem 30. A spring 74 is interposed between the yoke 50 and cup-like portion of the pressure bar 66.

Fig. 2 shows the semi-cylindrical shape assumed by the cover 26 when the cover and its associated parts are conditioned for application to or removal from the saucepan 10. In this view, the handle 46 is turned so that it pulls upwardly on the stem 30 and center of cover 26 and pushes downwardly on pressure bar 66. This compresses spring 74 and causes the downturned ends 62 and 64 of this bar to engage opposite edges of cover 26 and bend or compress it into the semi-cylindrical shape shown in Fig. 2.

The discs 42 and 44 are preferably provided with the flattened portions 76 and 78 so that the upward thrust of the spring 74 against pressure bar 66 tends to hold the handle 46 in position shown in Fig. 2. If the handle 46 is now swung from the position shown in Fig. 2 to that shown in Fig. 3, the parts will assume the sealing position shown in the latter figure.

In Fig. 3, the spring 74 has forced pressure bar 66 upwardly, thereby permitting cover 26 to assume its normal disc-like condition, wherein the bead 28 is pressed into sealing engagement with the ring 24 by the force of spring 74. This spring rests on the yoke 50, which in turn is supported by the upper edge of the saucepan 10. The parts of the pressure cooker are now in cooking position, and any pressure built up in the saucepan will tend to increase the effectiveness of the seal between the bead 28 and ring 24.

After the contents of the pressure cooker have been cooked to the desired extent, the pressure is relieved by any suitable relief valve means, such as the tube 80 (Fig. 5) having a weight 82 resting thereon and sealing the upper end of the tube during the cooking operation. Pressure is released upon manually removing the weight 82 from tube 80. A safety valve 84 may also be provided in the cover 26. This safety valve is illustrated as a synthetic rubber blow-out plug, but other forms of safety valve may be used if desired.

Handle 46 is now swung to the position shown in Fig. 2, thereby causing the ends 62 and 64 of pressure bar 66 to flex the cover 26 into the semi-cylindrical shape shown in that figure. In this position of the cover 26, the ends of the central ridge-like portion of the cover engage the under side of the sealing ring 24 on a diameter perpendicular to the plane of Fig. 2. To remove the cover, it is necessary to incline this ridge so that the horizontal projection of this ridge is shorter than the diameter of the opening in the top of the saucepan.

In order to accomplish this necessary inclination of the ridge-like central portion of the cover 26, the cook presses downwardly on the handle 46 to free one end of the cover ridge from contact with the sealing ring 24 and to push this end of the cover downwardly while at the same time twisting the handle so that the ridge-like portion of the cover assumes an inclined position. Thus, in pressing down on the handle 46, the cook compresses the spring 74 to a greater extent than is shown in Fig. 2, and at the same time, yoke 50 is rocked on the upper edge of the saucepan, the curved ends of the yoke being so shaped that this rocking motion of the yoke does not raise its central portion upwardly relative to the top of the saucepan. As soon as the necessary inclination of the cover has been attained, the cover can be lifted upwardly through the circular opening in the top of the saucepan, since the downwardly flexed edges of the cover have been drawn inwardly sufficiently by this downward flexure to permit them to pass through this circular opening.

After the cover has been removed from the saucepan, the handle 46 may be left in the position shown in Fig. 2. While the cover is removed from the saucepan with its handle 46 in the position shown in Fig. 2, the yoke 50 rests against the upper surface of cover 26 instead of being spaced therefrom, as shown in this figure. However, if the pressure cooker is not to be used again for some time, it is better to swing the handle to the position shown in Fig. 3 and release the tension on the spring 74 and cover 26. If this is done, it is necessary to return the handle 46 to the position in which it is shown in Fig. 2 before the cover can be reapplied to the saucepan.

In applying the cover to the saucepan, the cover is tilted until the horizontal projection of its ridge-like portion is less than the diameter of the opening in the saucepan. The cover is then lowered through this opening in this inclined position. The ends of the yoke 50 will engage the upper portion of the saucepan before the upper end of the ridge-like portion of the cover has been lowered into position and a downward force must be exerted on the handle 46 to compress spring 74 beyond the position shown in Fig. 2 and permit the upper end of this ridge-like portion of the cover to move downwardly to a level below that of the sealing ring 24. The handle 46 is then manipulated to swing the cover to a substantially horizontal position so that both ends of this ridge-like portion engage beneath the sealing ring 24. Handle 46 is next shifted to the position shown in Fig. 3, whereupon, the pressure cooker is in operating condition.

Figs. 7, 8, and 9 illustrate a modified form of my invention, wherein it is unnecessary to exert any downward pressure on the cover handle during the application or removal of the cover from the saucepan. In this modification, the cover 100 is attached by screw 102 to a stem 104 having an opening 106 at its upper end for receiving a pivot pin 108 eccentrically mounted in discs or cams 110 and 112 attached to the cover handle 114.

Yoke 116 is riveted or otherwise suitably secured to the lower end of a sleeve 118 slidably mounted on the stem 104 and having slots 120 and 122 through which pivot pin 108 extends. The upper end of sleeve 118 is provided with a head 124 supported on circular lugs 126 and 128 provided, respectively, by cams 110 and 112. A spring 130 surrounds sleeve 118 and is confined between yoke 116 and pressure bar 132.

Fig. 7 shows the cover in sealing engagement with the saucepan 10. In order to remove the cover from the saucepan, handle 114 is shifted to the position shown in Fig. 9. This produces a relative movement between stem 104 and pressure bar 132, causing the parts to assume the positions shown in Fig. 9. In these positions, the spring 103 is compressed to the maximum extent necessary to remove or apply the cover to the saucepan, and the cover is flexed into semi-cylindrical shape by the ends of the pressure bar 132.

The cover can be removed from the saucepan by manipulating handle 114 so that the ridge-like portion of the cover 100 is inclined sufficiently to permit the cover to be withdrawn through the circular opening in the top of the saucepan. After the cover has been removed, yoke 116 remains in elevated position, since it is held in this position by the engagement of lugs 126 and 128 beneath the head 124 of sleeve 118. Thus, no change takes place in the positions of the parts after the cover has been removed from the saucepan unless the handle 114 is manually shifted from the position shown in Fig. 9 to that shown in Fig. 7. Cams 110 and 112 are provided with flattened parts 134 and 136 to prevent accidental displacement of the handle 114 from the position shown in Fig. 9.

While the cover is removed from the saucepan, the handle 114 may be permitted to remain in the position shown in Fig. 9, or may be shifted to the position shown in Fig. 7 in order to relieve the tension on the spring 130 and cover 110, but before reapplying the cover to the saucepan, this handle must be in the position shown in Fig. 9.

With the handle 114 in the position shown in Fig. 9, the cover may be applied to the saucepan by inclining the ridge-like portion thereof sufficiently to permit it to pass through the cylindrical opening in the saucepan. The ridge-like portion of the cover is then permitted to assume a horizontal position which will bring the end of this ridge-like portion beneath the sealing ring 24. Handle 114 is then shifted to the position shown in Fig. 7, whereupon, the various parts of the cover assembly will assume the position shown in this figure. In this position, spring 130 holds cover 100 in sealing engagement with sealing ring 24, and any fluid pressure created in the saucepan reenforces this seal.

It is to be understood that my invention is not limited to the details illustrated and described, but may assume numerous other forms and that the scope of my invention is defined by the following claims.

I claim:

1. A pressure vessel of the class described comprising a container having an opening therein and a sealing surface on the inner side of said opening, a flexible resilient sheet metal cover for sealing said opening, said cover normally having dimensions larger than said opening, a handle for said cover, and means mounted solely on said cover and operated by said handle to reduce a dimension of said cover to permit insertion of said cover through said opening, said last-named means comprising cooperating interconnected parts for simultaneously applying oppositely directed components of forces respectively at the center of the cover and at at least two points spaced a substantial distance from the center, said force components being substantially parallel to the polar axis of the cover.

2. A pressure vessel of the class described comprising a container having an opening, a flexible resilient sheet metal cover for said opening having a normal size too large to permit insertion of said cover through said opening, a pressure bar movable relative to said cover for reducing a dimension of said cover to permit insertion of said cover through said opening, and cooperating interconnected movable means carried by said cover and operable simultaneously to apply oppositely directed force components thereto, respectively at the center and at at least two diametrically opposite portions of the cover at a substantial distance from the center thereof, said force components being substantially parallel to the polar axis of the cover.

3. A pressure vessel of the class described comprising a container having an opening and a sealing surface on the inner side of said opening, a cover adapted to effect a fluid-tight seal with said surface, said cover normally being too large for insertion through said opening, a handle for said cover, a yoke engageable with the top of said container, a pressure bar guided by said yoke, means operated by said handle for causing relative movement between said pressure bar and yoke and for causing said pressure bar to distort said cover to permit insertion thereof through said opening, and spring means for holding said cover in sealing engagement with said surface.

4. In a pressure vessel of the class described, the combination of a container having openings therein and a sealing surface on the inner side of said opening, a cover assembly including a cover adapted to seal with said surface, said cover being larger than said opening, a stem attached to said cover, a yoke slidable on said stem and adapted to engage said vessel, a pressure bar slidable on said stem, a spring confined between said yoke and said pressure bar, and handle means attached to said stem, said handle means being operable to cause relative movement between said yoke and pressure bar to distort said cover and permit its insertion through said opening.

5. In a pressure vessel of the class described, the combination of a container having an opening therein and a sealing surface on the inner side of said opening, a cover for sealing with said surface, said cover being larger than said opening, a stem secured to said cover, a sleeve slidable on said stem, a yoke attached to said sleeve and adapted to engage said container on opposite sides of said opening, a pressure bar for distorting said cover to permit its insertion or removal through said opening, said pressure bar being guided on said sleeve and having downwardly extending cover engaging ends guided by said yoke, a spring surrounding said sleeve and tending to separate said yoke and pressure bar, cam means resting on said pressure bar and eccentrically pivoted to said stem, said cam means including means for causing relative movement between said sleeve and said pressure bar, and a handle for operating said cam means.

6. A pressure vessel of the class described, comprising a container having an opening, a cover for said opening having a normal size too large to permit insertion of said cover through said opening, a pressure bar movable relative to said cover for exerting a localized force against certain portions thereof, a member secured to another portion of said cover, and a cam interposed between said pressure bar and member for simultaneously forcing the pressure bar against said first-named portions of the cover and drawing said second-named portion of the cover toward the pressure bar, thereby deforming the cover to permit its insertion through the container opening.

7. In a pressure vessel of the class described, the combination of a container having an opening therein and a sealing surface on the inner side of said opening, a cover assembly including a cover to seal with said surface, said cover being larger than said opening, a stem attached to said cover, a yoke slidable on said stem and adapted to engage said vessel, a pressure bar slidable on said stem, cam means resting on said pressure bar and eccentrically pivoted to said stem, and a handle for rotating said cam means to cause relative movement between the stem and the pressure bar.

8. In a pressure vessel of the class described, the combination of a container having an opening therein and a sealing surface on the inner side of said opening, a cover assembly including a cover to seal with said surface, said cover being larger than said opening, a stem attached to said cover, a yoke slidable on said stem and adapted to engage said vessel, a pressure bar slidable on said stem, cam means resting on said pressure bar and eccentrically pivoted to said stem, and a handle for rotating said cam means to cause relative movement between the stem and the pressure bar, said pressure bar engaging the cover at diametrically opposed points forcing the cover to assume a shape in which its horizontal projection is elliptical.

9. A pressure cooker of the class described comprising, a container having a circular opening in the top thereof and an inwardly facing sealing surface surrounding said opening, a resilient circular sheet metal cover having a diameter greater than that of said opening, movable means carried by said cover and engageable with said cover at diametrically opposite points near the edge of the cover, means interconnected with the movable means and attached to the cover at the center thereof and operable to apply an upwardly directed force to the cover and at the same time to apply downwardly directed forces to said cover through said movable means thereby to flex said cover to a shape in which is may readily pass through the opening in the container, and means having at least one dimension greater than the diameter of the opening in said container, cooperating with the cover, and supporting the latter in position near the sealing surface when the cover is inserted in the container.

10. In a pressure cooker of the class described, the combination of a container having a circular opening in the top thereof and having an annular sealing surface around the inner side of the opening, a circular cover of resilient flexible sheet metal having a diameter greater than that of said opening, and manually operable force multiplying means for flexing said cover to a shape generally elliptical in a projection on a plane perpendicular to its vertical axis with the minor axis of the ellipse less than the diameter of the container opening, said last-named means comprising cooperating interconnected parts for applying a force in one direction at the center of the cover and at the same time applying forces in the opposite direction at at least two points spaced a substantial distance from said center, whereby the cover when flexed by said last-named means may be readily passed through the opening in the container.

ALFRED VISCHER, Jr.